United States Patent
Ghani et al.

(10) Patent No.: US 8,620,837 B2
(45) Date of Patent: Dec. 31, 2013

(54) DETERMINATION OF A BASIS FOR A NEW DOMAIN MODEL BASED ON A PLURALITY OF LEARNED MODELS

(75) Inventors: Rayid Ghani, Chicago, IL (US); Marko Krema, Evanston, IL (US)

(73) Assignee: Accenture Global Services Limited, Dublin (IE)

( * ) Notice: Subject to any disclaimer, the term of this patent is extended or adjusted under 35 U.S.C. 154(b) by 190 days.

(21) Appl. No.: 13/179,741

(22) Filed: Jul. 11, 2011

(65) Prior Publication Data
US 2013/0018825 A1    Jan. 17, 2013

(51) Int. Cl.
G06F 15/18    (2006.01)

(52) U.S. Cl.
USPC .......................................................... 706/12

(58) Field of Classification Search
None
See application file for complete search history.

(56) References Cited

U.S. PATENT DOCUMENTS

| | | | |
|---|---|---|---|
| 5,146,405 A | | 9/1992 | Church |
| 2003/0187702 A1* | | 10/2003 | Bonissone et al. ................. 705/4 |
| 2012/0310996 A1* | | 12/2012 | Kulack et al. ................. 707/810 |
| 2013/0018651 A1 | | 1/2013 | Djordjevic et al. |
| 2013/0018824 A1 | | 1/2013 | Ghani et al. |

OTHER PUBLICATIONS

Breese et al. "Decision-Theoretic Case-Based Reasoning", IEEE Trans. on SMC, vol. 26, No. 6, 1996, pp. 838-842.*
Cao "Model selection based on expected squared Hellinger distance", Theses, Colorado State University, 2007, pp. 4.*
Smyth et al. Hierarchical Case-Based Reasoning Integrating Case-Based and Decompositional Problem-Solving Techniques for Plant-Control Software Design, IEEE Trans. on KDE, vol. 13, No. 5, 2001, pp. 793-812.*
Search Report issued in EP 11305901.8 on Jan. 2, 2012.
Qiaozhu Mei, et al.: "Topic Sentiment Mixture: Modeling Facets and Opinions in Weblogs", WWW 2007/ Track: Data Mining, May 12, 2007, pp. 171-180, XP55015419.
"Joint Sentiment/Topic Model for Sentiment Analysis", Lin, C. and He, Y., CIKM '09, Nov. 2-6, 2009, Hong Kong, China.
Wang, "Sentiment Analysis of Online Product Reviews with Semi-supervised Topic Sentiment Mixture Model", 2010 Seventh International Conference on Fuzzy Systems and Knowledge Discovery (FSKD 2010), IEEE, pp. 2385-2389 (2010).

* cited by examiner

*Primary Examiner* — Li-Wu Chang
(74) *Attorney, Agent, or Firm* — Harrity & Harrity, LLP

(57) ABSTRACT

In a machine learning system in which a plurality of learned models, each corresponding to a unique domain, already exist, new domain input for training a new domain model may be provided. Statistical characteristics of features in the new domain input are first determined. The resulting new domain statistical characteristics are then compared with statistical characteristics of features in prior input previously provided for training at least some of the plurality of learned models. Thereafter, at least one learned model of the plurality of learned models is identified as the basis for the new domain model when the new domain input statistical characteristics compare favorably with the statistical characteristics of the features in the prior input corresponding to the at least one learned model.

29 Claims, 3 Drawing Sheets

DETERMINATION OF A BASIS FOR A NEW DOMAIN MODEL BASED ON A PLURALITY OF LEARNED MODELS

CROSS-REFERENCE TO RELATED APPLICATIONS

This application is related to U.S. patent application Ser. No. 13/179,707, filed Jul. 11, 2011.

FIELD

The instant disclosure relates generally to machine learning systems and, in particular, to the determination of which of a plurality of learned models to use as a basis for creating a learned model for a new domain.

BACKGROUND

A variety of machine learning systems and applications are well known in the art. In many machine learning systems, the ability of the system to understand how to process (e.g., classify, cluster, etc.) newly presented data is determined according to a model (referred to herein as a learned model) that is itself developed based on input data previously provided to the machine. Stated another way, such models attempt to discover and mimic the patterns found in the input data (sometimes referred to herein simply as "input") such that outcomes may be properly predicted for subsequently processed inputs. A variety of techniques are known in the art for developing such models, which are often tailored to the specific nature of the input data being processed and the desired outcomes to be achieved. For example, a significant body of literature has been developed concerning machine learning systems for developing understanding of real-world domains based on the analysis of text. As used herein, a domain may be thought of as a particular subject/topic/thing of interest.

Generally, the performance of learned models improves as the relative breadth of the domain is restricted. That is, the accuracy of the learned model is likely to be better if the breadth of the input data is relatively narrow. For example, the semantic content of text relating to the domain of "digital cameras" is likely to include fewer patterns to be discovered, and therefore more likely to be accurate, than the broader domain of "image capture devices." Conversely, while more restricted domains may present the opportunity for more accurate learned models, the narrow scope of a given domain may result in a situation where there is a relative lack of information from which the system can develop a learned model in the first instance.

Additionally, some machine learning systems relying on so-called supervised learning wherein the system is provided with a quantity of training data from which the learned model is at least initially developed. Such training data typically comprises input data (e.g., natural language text samples) where the desired outcome is known and provided to the machine learning system. For example, in the case of a learning system implementing a classification-based spam filter, the system may be provided with examples of text for which the determination of "spam" or "not spam" has already been made. Based on this training data, the learning system can develop a learned model reflecting those characteristics of the text that best predict when something will be classified or labeled as "spam" or "not spam" such that subsequent input text may be classified according to the learned model in order to predict the outcome, i.e., whether or not the new input should be classified as spam. While such systems have proven successful, the relative cost of obtaining accurate and useful training data can be quite expensive, particularly, for example, where human subject matter experts are required to develop the training data.

Techniques that permit the accurate and cost-effective development of learned models for use in machine learning systems would represent a welcome addition to the art.

SUMMARY

The instant disclosure describes techniques for rapidly and efficiently developing learned models for new domains addressed by machine learning systems. In particular, the techniques described herein take advantage of the fact that input data underlying learned models for different domains is often related such that substantial overlap exists. Thus, in a machine learning system in which a plurality of learned models, each corresponding to a unique domain, already exist, new domain input for training a new domain model may be provided. In an embodiment, statistical characteristics of features in the new domain input are first determined. The resulting new domain statistical characteristics are then compared with statistical characteristics of features in prior input previously provided for training at least some of the plurality of learned models. Thereafter, at least one learned model of the plurality of learned models is identified as the basis for the new domain model when the new domain input statistical characteristics compare favorably with the statistical characteristics of the features in the prior input corresponding to the at least one learned model. In an embodiment, the statistical characteristics employed comprise frequency of occurrence of the features in both the new input data and the prior data. Furthermore, while various metrics may be employed for purpose of the comparison, in an embodiment, a Hellinger metric used for this purpose. Furthermore, the plurality of learned models may comprise combinations of learned models and/or subsets of individual learned models. Once identified, the at least one learned model may serve as the basis for retraining according to the new domain input to provide the new domain model that, in turn, may subsequently be used to analyze additional new domain input. In one embodiment, the various inputs (the new domain input, prior input and additional new domain input) may all take the form of text. Various methods and apparatus in accordance with these techniques are described.

Using the techniques described herein, new models may be developed while alleviating the delay in deploying such models. Additionally, to the extent that the starting point for a new model may leverage the learning incorporated into a prior model, at least the initial accuracy of the resulting new model may be improved in comparison.

BRIEF DESCRIPTION OF THE DRAWINGS

The features described in this disclosure are set forth with particularity in the appended claims. These features will become apparent from consideration of the following detailed description, taken in conjunction with the accompanying drawings. One or more embodiments are now described, by way of example only, with reference to the accompanying drawings wherein like reference numerals represent like elements and in which:

DETAILED DESCRIPTION OF THE PRESENT EMBODIMENTS

Figure 1:
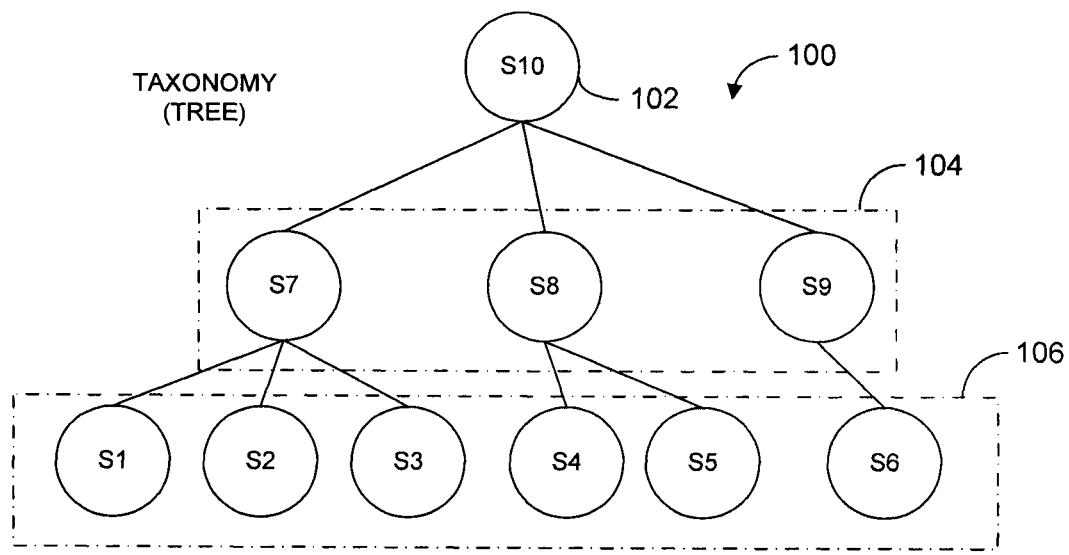
FIG. 1 is an illustration of a plurality of learned models arranged according to a tree taxonomy in accordance with an embodiment of the instant disclosure.
Figure 2:
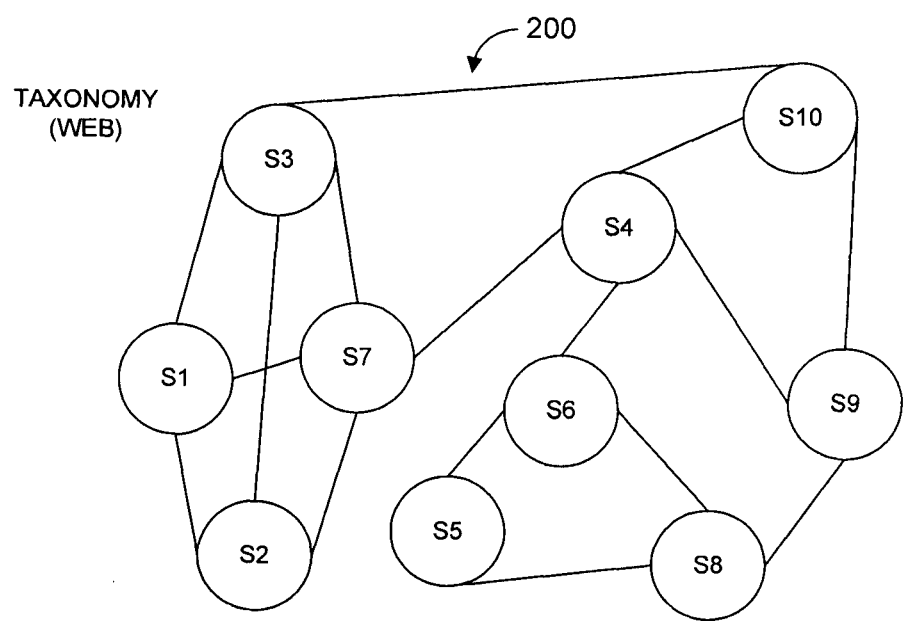
FIG. 2 is an illustration of a plurality of learned models arranged according to a web taxonomy in accordance with an embodiment of the instant disclosure.

Referring now to FIGS. 1 and 2, examples of a plurality of learned models arranged according to various taxonomies are illustrated. An assumption of the instant disclosure is that the plurality of learned models, such as those illustrated in FIGS. 1 and 2, have been previously developed according to prior input data. More specifically, each of the plurality of models are developed for a corresponding domain based on prior input data that corresponds to that model's domain. Techniques for providing learned models are well known in the art including, for example, those described in the co-pending application Ser. No. 13/179,707, owned by the instant assignee and filed on even date herewith ("the Co-Pending Application"), the teachings of which co-pending application are incorporated herein by this reference. While the teachings of the Co-Pending Application are generally directed to learned models that are primarily used as sentiment classifiers, it is noted that the instant disclosure in not limited in this regard. In fact, the techniques described herein for determining which of a plurality of learned models to use as the basis for a new domain model may be equally applied to virtually any type of learned model in which features of input data are used to develop such learned models. Furthermore, the instant disclosure in not limited according to the type of input data used to develop the learned models. For example, in one embodiment described herein, the input data may comprise text, such as natural language text documents or the like. However, as known in the art, other types of input data (such as images) where features of the input data may be analyzed may be equally employed.

Referring once again to FIG. 1, an example of a tree taxonomy 100 is shown in which the tree taxonomy 100 comprises a top node 102 a plurality of middle nodes 104, and a plurality of bottom nodes 106. Each node of the tree taxonomy 100 represents one learned model. It is understood that the actual number and levels of nodes in the tree taxonomy 700 may vary, but at least one top node and two bottom nodes are usually necessary for a meaningful tree taxonomy. As shown in FIG. 1, each node (i.e., learned model) is associated with a domain or subject labeled S1 to S10, respectively. The tree taxonomy 100 is organized based on the relationship between the subjects associated with each node. For example, suppose the sets of input data used to provide the learned models S1, S2, and S3 are online product reviews of "scarves", "gloves" and "belts", respectively; that the sets of input data used to provide learned model S7 are more general online product reviews of "accessories"; and, finally, that the sets of input data used to provide learned model S10 are yet more general online product reviews of "apparel". Accordingly, the domains associated with the learned models follow the subjects of the corresponding input data: learned model S1 concerns "scarves", learned model S2 concerns "gloves", learned model S3 concerns "belts", learned model S7 concerns "accessories" and learned model S10 concerns "apparel". Note that the respective models become increasingly generalized from the bottom-most nodes 106 to the top node 102. Thus, in an embodiment, at least some of the plurality of learned models (e.g., S1, S2, S3) may be aggregated to form another learned model (e.g., S7) based on the subjects associated with the at least some of the plurality of sentiment classifiers. As known in the art, any given learned model may be augmented by the provision of additional input data.

In another embodiment with reference to FIG. 2, a web taxonomy 200 may instead be used. Different from the hierarchical structure of the tree taxonomy 100, all the nodes in the web taxonomy 200 are at the same level and thus, there are no top node or bottom nodes in the web taxonomy 200. In addition, each node in the tree taxonomy 100 is only connected to its upper node and/or its lower nodes, while in the web taxonomy 200, each node may be connected (associated with) to any number of other nodes based on the relevancy of their associated subjects. For example, given their related subjects, the sentiment classifiers S1, S2, S3, and S7 are all connected with each other in the web taxonomy 200.

As described in the Co-Pending Application, the various taxonomies 100, 200 may be used to identify which of the plurality of learned models to use for any new input data to be analyzed. For example, and building upon the examples previously described, the new input may be one or more online product reviews of a new belt. Referring back to FIG. 1, if the learned models are organized in the tree taxonomy 100, the subject associated with the new input can be traversed from a bottom node to the top node. Thus, the learned model S3 corresponding to "belts" is identified as the first applicable learned model for the new input due to the matching of their subjects. Since leaned model S3 "belts" is connected to its upper node, learned model S7 "accessories", it too can be identified as another applicable learned model since its associated subject "accessories" is also related to the subject "belt" of the new input. Likewise, the top node, learned model S10 "apparel", of the tree taxonomy 100 may also be relevant given its "apparel" domain. Accordingly, three applicable learned models (S3, S7, and S10) are identified in this example for analyzing the new input. Referring now to FIG. 2, if the learned models are organized in the web taxonomy 200, once an initial learned model is identified, the connections between the learned models can be traversed any desired number of times away from the identified node in order to determine whether each of its connected nodes are also applicable for the new input based upon relevance determinations of their associated subjects.

There may be instances, however, where none of the existing learned models in the taxonomy 100, 200 represents an identical match (or even nearly so) for the domain of a given set of input data. For example, where the input data corresponds to the new domain of "jewelry", the taxonomies 100, 200 as defined above do not comprise an explicit "jewelry" domain. In this case, then, it may make sense to establish a new domain model corresponding to the new domain of "jewelry". However, if the input data for this new domain is presently sparse or limited in quantity, then the initial learned model may not perform very well. On the other hand, it seems evident that the new domain of "jewelry" would like have some features (within its input data) in common with any of a number of the learned models existing under the learned model S10 "apparel" or even the learned model S7 "accessories". Given this likely relatedness, a better initial learned model for the new "jewelry" domain may be provided if it is based on one of the plurality of learned models already within the taxonomy 100, 200, or even combinations of such models or subsets of such models. As described in further detail below, the instant disclosure describes techniques for identifying such existing learned models to serve as the basis for a new domain model.

Figure 3:
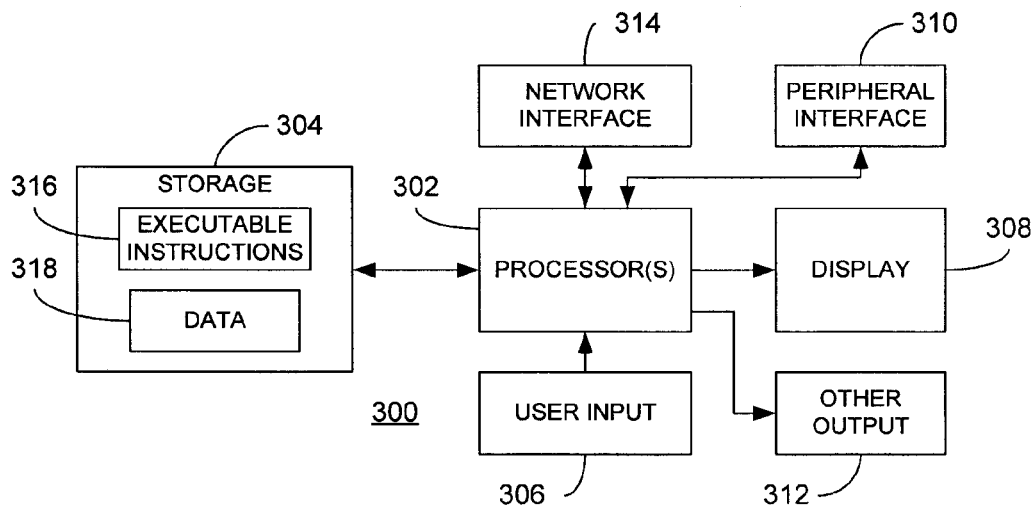
FIG. 3 is a block diagram of a processing device that may be used to implement various embodiments in accordance with the instant disclosure.

FIG. 3 illustrates a representative processing device 300 that may be used to implement the teachings of the instant disclosure. The device 300 may be used to implement, for example, the processing illustrated below with regard to FIG. 4 and/or to implement one or more components of the apparatus 500 illustrated in FIG. 5, as described in greater detail below. Regardless, the processing device 300 includes a processor 302 coupled to a storage component 304. The storage component 304, in turn, includes stored executable instructions 316 and data 318. In an embodiment, the processor 302 may include one or more processing devices such as a microprocessor, microcontroller, digital signal processor, or combinations thereof capable of executing the stored instructions 316 and operating upon the stored data 318. Likewise, the storage component 304 may include one or more devices such as volatile or nonvolatile memory including but not limited to random access memory (RAM) or read only memory (ROM). Further still, the storage component 304 may be embodied in a variety of forms, such as a hard drive, optical disc drive, floppy disc drive, etc. Processor and storage arrangements of the types illustrated in FIG. 3 are well known to those having ordinary skill in the art, for example, in the form of laptop, desktop, tablet, or server computers. In one embodiment, the processing techniques described herein are implemented as a combination of executable instructions and data within the storage component 304.

As shown, the processing device 300 may include one or more user input devices 306, a display 308, a peripheral interface 310, other output devices 312, and a network interface 314 in communication with the processor 302. The user input device 306 may include any mechanism for providing user input to the processor 302. For example, the user input device 306 may include a keyboard, a mouse, a touch screen, microphone, and suitable voice recognition application or any other means, whereby a user of the processing device 300 may provide input data to the processor 302. The display 308 may include any conventional display mechanism such as a cathode ray tube (CRT), flat panel display, or any other display mechanism known to those having ordinary skill in the art. In an embodiment, the display 308, in conjunction with suitable stored instructions 316, may be used to implement a graphical user interface. Implementation of a graphical user interface in this manner is well known to those having ordinary skill in the art. The peripheral interface 310 may include the hardware, firmware and/or software necessary for communication with various peripheral devices, such as media drives (e.g., magnetic disk or optical disk drives), other processing devices, or any other input source used in connection with the instant techniques. Likewise, the other output device(s) 312 may optionally include similar media drive mechanisms, other processing devices, or other output destinations capable of providing information to a user of the processing device 300, such as speakers, LEDs, tactile outputs, etc. Finally, the network interface 314 may include hardware, firmware, and/or software that allows the processor 302 to communicate with other devices via wired or wireless networks, whether local or wide area, private or public, as known in the art. For example, such networks may include the World Wide Web or Internet, or private enterprise networks, as known in the art.

Figure 4:
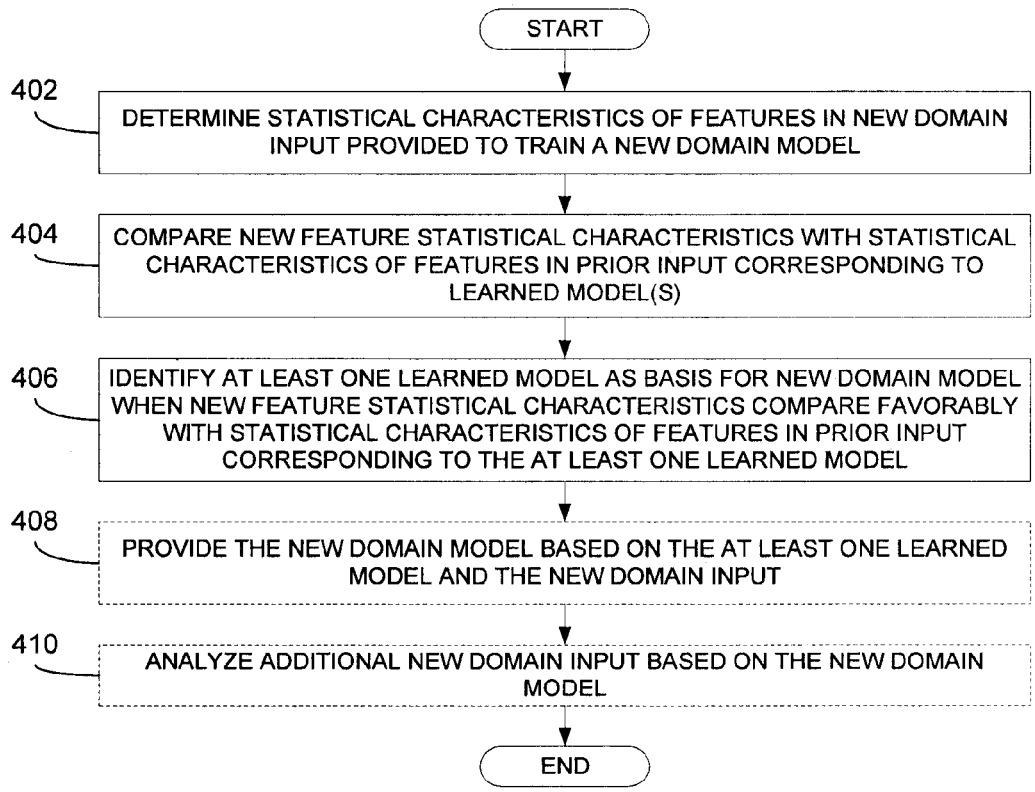
FIG. 4 is a flow chart illustrating processing in accordance with an embodiment of the instant disclosure.
Figure 5:
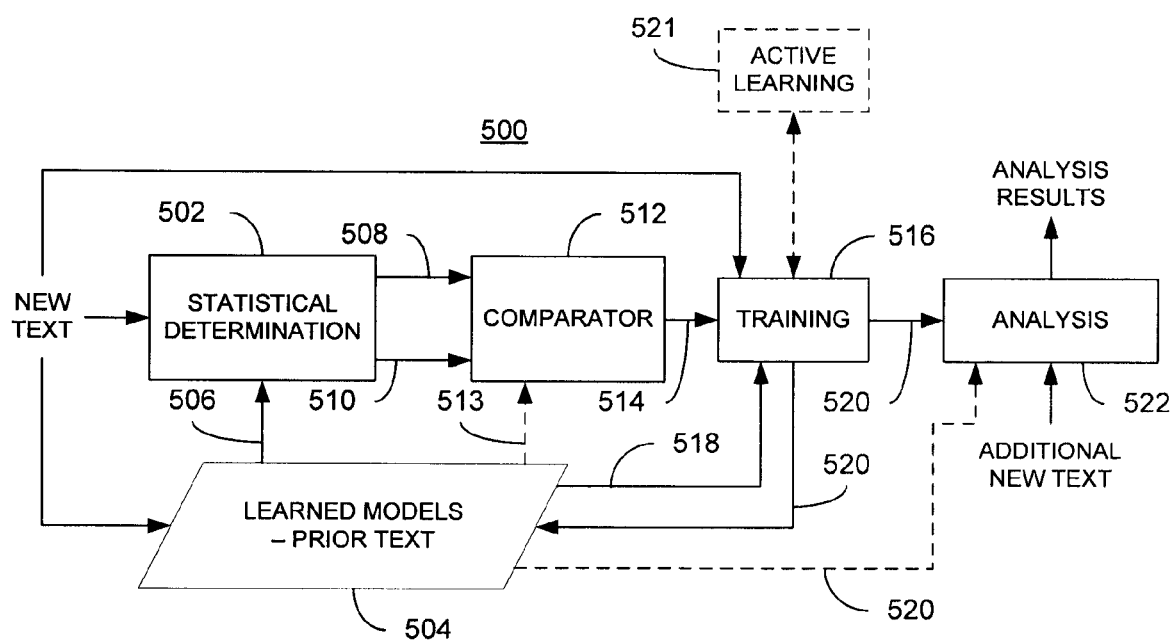
FIG. 5 is a block diagram of an apparatus for determining which of a plurality of learned models to use as a basis for a new domain model in accordance with a text-based embodiment of the instant disclosure.

While the processing device 300 is a form for implementing the various embodiments described herein, including those shown in FIGS. 4 and 5, those having ordinary skill in the art will appreciate that other, functionally equivalent techniques may be employed. For example, rather than using a single processing device 300, the functionality described herein may be separated over multiple processing devices. Furthermore, as known in the art, some or all of the functionalities implemented via executable instructions may also be implemented using firmware and/or hardware devices such as application specific integrated circuits (ASICs), programmable logic arrays, state machines, etc. Further still, other implementations of the processing device 300 may include a greater or lesser number of components than those illustrated. Once again, those of ordinary skill in the art will appreciate the wide number of variations that may be used is this manner.

Referring now to FIG. 4, processing in accordance with an embodiment is further illustrated. As noted above, the processing illustrated in FIG. 4 may be performed by the processing device 300 of FIG. 3, wherein the functionalities described are implemented in the form of stored instructions and data executed by the processor 302. However, as further noted above, other functionally equivalent implementations are also possible. Regardless, beginning at block 402, statistical characteristics of features in new domain input are determined to provide new feature statistical characteristics. As used herein, a feature is any attribute of the input data (in this case, the new domain input) having utility, when characterized within a learned model, to discriminate proper outcomes for any given input data. For example, where learned models are applied to image processing, such features may comprise location-dependent hue and/or saturation intensities, or wavelet coefficients as known in the art. As another example, features of text-based input that may be used are the words or phrases themselves of a given text sample, their corresponding parts of speech tags, etc. In a similar vein, the statistical characteristics employed at block 402 will necessarily depend upon the nature of the features being used. For purposes of the instant disclosure, the statistical characteristics employed should permit comparison of the relative degree of similarity between given sets of input data that have been used, or are going to be used, to establish a learned model. That is, the statistical characteristic chosen for this purpose should provide a representation of sets of input data that permits comparisons and differentiation between the sets of input data. For example, the statistical characteristic determined at block 402 may be based on the frequency of such word, phrase, etc. features within the input data. In one embodiment, the well-known term frequency-inverse document frequency (TF-IDF) weight determination is used to assign scores to each feature of a given document, thereby permitting characterization of each document. As known, TF-IDF is based on two intuitions: first, the more a feature occurs in a document (TF) the more important it is in describing that document and, second, the more a feature occurs in other documents (IDF) the less important it is in describing that document. For example, if the feature "technical_support" occurs five times in a given document, its TF will be 5. On the other hand, if that same feature occurs within one hundred documents in a collection, the IDF would be 100. To combine these terms to derive the feature's score, in an embodiment, the formula log(TF/IDF) may be employed, although those having ordinary skill in the art will appreciate that other combinations of the TF and IDF terms may be employed. In a further embodiment, each TF-IDF score may be further normalized by the well-known $L^2$-norm taken across all scores for the document. Regardless, each document may then be characterized as a vector, for example, of the TF-IDF scores for its constituent features.

Although not expressly illustrated as a block in FIG. 4, the same type of statistical characteristics are also determined for the plurality of learned models, e.g., the pre-existing learned models set forth in the taxonomies 100, 200. For example, in an embodiment, the statistical characteristics for a learned model may be based on the features in prior input data used to train that learned model. The determination of the statistical characteristics of the prior input data for each of the plurality of learned models may be done at time of creation of a given learned model, particularly where the prior input data used to create the given learned model remains unchanged since its creation. Alternatively, where a given learned model is updated from time to time based on its prior input data, then the determination of the statistical characteristics for that given learned model may be determined each time the model is updated, or prior to comparison of that model's statistical characteristics with other statistical characteristics. In short, the instant disclosure is not limited by when the statistical characteristics of features in the prior data are determined.

In another embodiment, the statistical characteristics for a given learned model of the plurality of learned models may derived from, or directly form a part of, the learned model itself. For example, as known in the art, it is possible to create a learned model directly without the use of training data, i.e., the conditional probabilities of features in the model can be specified directly by a user rather than derived from actual training data. Thus, in these cases where no prior input data is available, the conditional probabilities themselves of the given learned model may serve as the statistical characteristics to be compared against the conditional probabilities of a learned model derived from the new domain input data.

Regardless, processing continues at block 404 where the new feature statistical characteristics are compared with the statistical characteristics of features in the prior input corresponding to the plurality of learned models. That is, the comparison at block 404 determines how similar the new feature statistical characteristics are to the statistical characteristics of features in the prior input. For example, in an embodiment, the new feature statistical characteristics are compared with the statistical characteristics of features in the prior input corresponding to each learned model of the plurality of learned models. In the scenario described above in which TF-IDF scores are used to create vectors that characterize documents, such comparisons between inputs may be achieved by performing pair-wise vector comparisons between documents in the respective inputs. However, those having ordinary skill in the art will appreciate that other techniques may be equally employed in this scenario, e.g., first clustering documents and comparing the clusters, etc. In another embodiment, the plurality of learned models may include combinations of existing learned models as in the case, for example, where a learned model for "belts" is combined with another learned model for "scarves", which resulting combined learned model may then be separately compared on the basis of its own statistical characteristics with the new feature statistical characteristics. In yet another embodiment, the plurality of learned models may include a subset of a given learned model, for example, again the case of the "belts" learned model, where a subset may include a learned model based only on input data derived from certain sources, such as advertisement copy. While it may be desirable to compare the new feature statistical characteristics against the statistical characteristics corresponding to each of the plurality of learned models, this is not a requirement as it may be desirable to compare against only some of the available plurality of learned models.

Continuing at block 406, at least one learned model is identified as the basis for the new domain model when the new feature statistical characteristics compare favorably with the statistical characteristics of features in prior input data corresponding to the at least one learned model. As used herein, a favorable comparison results when the similarity of compared statistical characteristics exceeds a desired threshold according to a suitable metric. For example, in one embodiment, a Hellinger metric or distance, as known in the art, can be calculated based on the statistical characteristics being compared. Of course, other suitable metrics known in the art may be employed, such as cosine similarity, Jaccard index, Dice coefficient, KL divergence, root mean square error, etc. Regardless of the metric employed, increasingly lower distances or differences as evaluated by the metric correspond to increasingly favorable comparisons. Thus, in one embodiment, the comparison resulting in the lowest distance or difference is selected as the best, and the learned model corresponding to the prior input giving rise to the statistical characteristics is identified as learned model to be used as the basis for the new domain model. Alternatively, where there may be multiple learned models giving rise to distance or difference values below a threshold, then it may be desirable to combine the multiple learned models to serve as the basis for the new domain model. As a further alternative, where a given learned model spans multiple sub-domains, the corresponding prior input could be divided into corresponding subsets with the comparison described above proceeding on the basis of such subsets.

Having identified at least one learned model of the plurality of learned models as the basis for the new domain model, additional processing may occur as illustrated by blocks 408 and 410. Thus, at block 408, the new domain model may be provided based on the at least one learned model identified at block 406 and the new domain input. For example, where the learned models are developed according to a supervised or semi-supervised algorithm, the new domain input may be used as additional training data to re-train the at least one learned model. The resulting, retrained model is then provided as the new domain model. Furthermore, using an active learning component (as illustrated in FIG. 5 and described below), active learning techniques may be applied in the process of providing the new domain model. Thereafter, as shown by block 410, the new domain model may be employed to analyze additional new input data. For example, where the respective learned models comprise text-based classifiers, the new domain model may be used to classify additional new input text in order to classify the new additional input text according to the new domain.

Referring now to FIG. 5, an apparatus 500 for use in conjunction with text-based learned models is illustrated. Although the apparatus 500 is described herein as being particularly applicable to text-based applications, it will be appreciated that the illustrated structure can be equally applied applications based on other types of input data.

The apparatus 500 comprises a statistical determination component 502 operatively connected to a storage component 504 and a comparator 512. In turn, the comparator 512 is operatively coupled to a training component 516 and optionally operatively connected to the storage component 504. The training component 516 is operatively coupled to the storage component 504 and, optionally, an active learning component 521. Finally, an analysis component 522 is operatively coupled to the training component 522 and optionally operatively coupled to the storage component 504.

As shown, new text input (corresponding to a new domain, as described above) is provided to the statistical determination component 502. In this embodiment, the statistical determination component 502 establishes a distribution of the relative frequencies of words and/or phrases (i.e., features) within the new text. Additionally, this same statistical characterization is performed by the statistical determination component 502 on the prior text 506 used to establish each of the prior learned models stored in the storage component 504. As further illustrated, the new text may be stored in the storage component 504 for subsequent association with the new domain model 520.

The statistical determination component 502 provides the statistical characteristics of the new text 508 (i.e., the new features statistical characteristics) as well as the statistical characteristics of the features in the prior text 506 for each of the learned models being compared to the comparator 512. As described above, the comparator 512 employs a suitable comparison metric to identify which of the prior learned models should serve as the basis for the new domain model. To this end, the comparator 512 may obtain identifications 513 of the learned models corresponding to the statistical characteristics being compared, thereby allowing the comparator 512 to identify which of the learned models being compared results in favorable comparisons, as described above. Alternatively, the statistical characteristics 510 corresponding to the learned models may also include identifications of the corresponding models for this same purpose. Regardless, the output of the comparator 512 is one or more identifications of learned models to serve as the basis for the new domain model.

In addition to the identification(s) of the at least one learned model identified by the comparator 512, the training component 516 also takes as input the at least one learned model 518 thus identified (or at least a copy thereof) as well as the new text, as shown. Using whatever learning algorithm that has been previously employed to develop the plurality of learned models stored in the storage component 504, the training component 516 creates the new domain model 520 by augmenting (or retraining) the at least one learned model 518 based on the new text. For example, in the case of a classifier employing a supervised learning algorithm, the new text is used to provide the new domain classifier by starting with the conditional probabilities (as known in the art) established by the at least one identified classifier and retraining based on the new text. In this manner, the previously established learned model (classifier, in the previous example) can be used to effectively "bootstrap" an entirely new learned model in a quick and efficient manner. As further illustrated in FIG. 5, the resulting new domain model may then be provided back to the storage component 504 for later recall. Also, as noted above, the new domain model 520 is associated with the new text within the storage model, i.e., the new text used to establish the new domain model 520 is essentially now the prior text, as that term is used above, for the new domain model 520.

As further shown, an active learning component 521 may be provided in conjunction with the training component 516. As described, for example, in U.S. patent application Ser. No. 11/855,493 (the "'493 application"), incorporated herein in its entirety by this reference and having the same assignee as the instant application, active learning techniques incorporate user input or feedback to improve the accuracy of models developed by learning-capable algorithms. In the case of classification algorithms applied to text, such techniques are capable of determining which words, if designated by a user as being either an attribute or value, would most improve the accuracy of the learning model. Generally, this is done by estimating how much the model can learn from knowing the label of an unlabeled example. Well known techniques for accomplishing this include, but are not limited to, random sample selection or the so-called density or KL-divergence sample selection metrics. Once such examples are selected, they are presented to a user (e.g., through a graphical user interface, such as that shown and described in the '493 application) for labeling. Based on user input thus provided, the models under consideration may then be updated accordingly, as known in the art.

Finally, as further shown in FIG. 5, the analysis component 522 obtains the new domain model 520 either directly from the training component 516 or from the storage component 504. As known in the art, the new domain model 520 is then used by the analysis component 522 to analyze additional new text to provide analysis results. Once again, in the case of text-based classifier for example, the analysis component 522 can use the new domain classifier to classify the additional new text, i.e., the analysis results will indicate the likelihood that the additional new text is properly classified in the new domain.

While particular preferred embodiments have been shown and described, those skilled in the art will appreciate that changes and modifications may be made without departing from the instant teachings. It is therefore contemplated that any and all modifications, variations or equivalents of the above-described teachings fall within the scope of the basic underlying principles disclosed above and claimed herein.

What is claimed is:

1. A method comprising:
receiving, by a processing device, data associated with a domain input;
determining, by the processing device, statistical characteristics associated with one or more features of the domain input to generate feature statistical characteristics;
identifying, by the processing device and based on the generated feature statistical characteristics, a plurality of learned models,
each of the plurality of learned models being associated with a respective other domain input,
each respective other domain input being different than the domain input;
comparing, by the processing device, the generated feature statistical characteristics with respective statistical characteristics associated with one or more features of the plurality of learned models;
identifying, by the processing device and based on the comparing, at least one learned model of the plurality of learned models that satisfies a threshold value;
modifying, by the processing device, the identified at least one learned model to create at least one trained model,
the at least one learned model being modified by analyzing the respective statistical characteristics associated with the one or more features of the identified at least one learned model and modifying a portion of the respective statistical characteristics associated with the one or more features of the identified at least one learned model that corresponds to the generated feature statistical characteristics associated with the domain input, and
the at least one trained model being different than each of the at least one learned model; and
using, by the processing device, the at least one trained model as a domain model to process the received data.

2. The method of claim 1, where
the statistical characteristics associated with the one or more features of the domain input are based on a frequency of occurrence of the one or more features in the domain input, and
the respective statistical characteristics associated with the one or more features of the plurality of learned models are based on a prior input,
the prior input occurring before the data is received.

3. The method of claim 1, where the respective statistical characteristics associated with the one or more features of the plurality of learned models are based on a prior input for training at least one of the plurality of learned models,
the prior input occurring before the data is received.

4. The method of claim 1, where, when comparing the generated feature statistical characteristics with the respective statistical characteristics associated with the one or more features of the plurality of learned models, the method includes:
comparing the generated feature statistical characteristics with the respective statistical characteristics associated with the one or more features of the plurality of learned models based on a Hellinger metric.

5. The method of claim 1, where a first learned model of the plurality of learned models comprises one or more second learned models of the plurality of learned models.

6. The method of claim 1, where a first learned model of the plurality of learned models comprises a subset of a second learned model of the plurality of models.

7. The method of claim 1, where the domain input comprises text.

8. The method of claim 1, further comprising:
providing, by the processing device, the domain model based on the identified at least one learned model and the domain input.

9. The method of claim 8, further comprising:
providing, by the processing device, the domain model further based on an active learning input.

10. The method of claim 1, further comprising:
analyzing, by the processing device, another domain input based on the domain model.

11. The method of claim 10, where the other domain input comprises text.

12. An apparatus comprising:
a processor; and
memory including instructions that, when executed by the processor, cause the processor to:
receive data associated with a domain input;
determine statistical characteristics associated with one or more features of the domain input to generate feature statistical characteristics;
identify, based on the generated feature statistical characteristics, a plurality of learned models,
each of the plurality of learned models being associated with a respective other domain input,
each respective other domain input being different than the domain input;
compare the generated feature statistical characteristics with respective statistical characteristics associated with one or more features of the plurality of learned models;
identify, based on the comparison, at least one learned model of the plurality of learned models that satisfies a threshold value;
modify the identified at least one learned model to create at least one trained model,
the at least one trained model being different than each of the at least one learned model, and
the processor, when modifying the identified at least one learned model, is further to:
analyze the respective statistical characteristics associated with the one or more features of the identified at least one learned model; and
modify a portion of the respective statistical characteristics associated with the one or more features of the identified at least one learned model that corresponds to the generated feature statistical characteristics associated with the domain input; and
use the at least one trained model as a domain model to process the received data.

13. The apparatus of claim 12, where
the statistical characteristics associated with the one or more features of the domain input are based on a frequency of occurrence of the one or more features in the domain input, and
the respective statistical characteristics associated with the one or more features of the plurality of learned models are based on a prior input,
the prior input occurring before the data is received.

14. The apparatus of claim 12, where the statistical characteristics associated with the one or more features of the plurality of learned models are based on a prior input for training at least one of the plurality of learned models,
the prior input occurring before the data is received.

15. The apparatus of claim 12, where the processor, when comparing the generated feature statistical characteristics with the respective statistical characteristics associated with the one or more features of the plurality of learned models, is further to:
compare the generated feature statistical characteristics with the respective statistical characteristics associated with the one or more features of the plurality of learned models based on a Hellinger metric.

16. The apparatus of claim 12, where a first learned model of the plurality of learned models comprises one or more second learned models of the plurality of learned models.

17. The apparatus of claim 12, where a first learned model of the plurality of learned models comprises a subset of a second learned model of the plurality of models.

18. The apparatus of claim 12, where the domain input comprises text.

19. The apparatus of claim 12, where the processor is further to:
provide the domain model based on the identified at least one learned model and the domain input.

20. The apparatus of claim 19, where the processor is further to:
provide the domain model further based on an active learning input.

21. The apparatus of claim 12, where the processor is further to:
analyze another domain input based on the domain model.

22. The apparatus of claim 21, where the other domain input comprises text.

23. A non-transitory computer readable medium storing instructions, the instructions comprising:
one or more instructions which, when executed by at least one processor, cause the at least one processor to:
receive data associated with a domain input;
determine statistical characteristics associated with one or more features of the domain input to generate feature statistical characteristics;

identify, based on the generated feature statistical characteristics, a plurality of learned models,
  each of the plurality of learned models being associated with a respective other domain input,
    each respective other domain input being different than the domain input;
compare the generated feature statistical characteristics with respective statistical characteristics associated with one or more features of the plurality of learned models;
modify the identified at least one learned model to create at least one trained model,
  the at least one trained model being different than each of the at least one learned model, and
  the one or more instructions to modify the at least one learned model include:
    one or more instructions to analyze the respective statistical characteristics associated with the one or more features of the identified at least one learned model; and
    one or more instructions to modify a portion of the respective statistical characteristics associated with the one or more features of the identified at least one learned model that corresponds to the generated feature statistical characteristics associated with the domain input; and
use the at least one trained model as a domain model to process the received data.

24. The non-transitory computer readable medium of claim 23, where
  the statistical characteristics associated with the one or more features of the domain input are based on a frequency of occurrence of the one or more features in the domain input, and
  the respective statistical features associated with the one or more features of the plurality of learned models are based on a prior input,
    the prior input occurring before the data is received.

25. The non-transitory computer readable medium of claim 23, where the one or more instructions to compare the generated feature statistical characteristics with the respective statistical characteristics associated with the one or more features of the plurality of learned models include:
  one or more instructions to compare the generated feature statistical characteristics with the respective statistical characteristics associated with the one or more features of the plurality of learned models based on a Hellinger metric.

26. The non-transitory computer readable medium of claim 24, where the domain input and the prior input comprise text.

27. The non-transitory computer readable medium of claim 23, where the instructions further comprise:
  one or more instructions to provide the domain model based on the identified at least one learned model and the domain input.

28. The non-transitory computer readable medium of claim 23, where the instructions further comprise:
  one or more instructions to analyze another domain input based on the domain model.

29. The non-transitory computer readable medium of claim 28, where the other domain input comprises text.

* * * * *